Patented Dec. 8, 1942

2,304,466

UNITED STATES PATENT OFFICE 2,304,466

STABILIZATION OF VINYL AROMATIC RESINS

Lorne A. Matheson, Raymond F. Boyer, and James L. Amos, Midland, Mich., assignors to The Dow Chemical Company, Midland, Mich., a corporation of Michigan No Drawing. Application March 20, 1940, Serial No. 325,050

10 Claims. (Cl. 260—91)

This invention concerns a method of stabilizing the resinous polymers of vinyl aromatic compounds such as styrene, para-chloro-styrene, para-ethyl-styrene, ortho-chloro-styrene, ortho-methyl-styrene, para-isopropyl-styrene, etc., against discoloration or oxidation during exposure to light or oxidizing gases such as air. For convenience, resins of the type just defined are hereinafter referred to generically as "vinyl aromatic resins."

In a co-pending application Serial No. 294,934, filed September 14, 1939, of ourselves, S. M. Stoesser and O. A. Braley, we have disclosed the preparation of relatively stable vinyl aromatic resins by polymerizing a vinyl aromatic compound, e. g., styrene, in the presence of a minute proportion of a polyhydric phenol such as catechol or tertiary butyl catechol. In this co-pending application, less than 0.05 per cent by weight of a polyhydric phenol is added to the vinyl aromatic compound, after which the latter is polymerized by heating. The resultant polymer is shown to be far more resistant to discoloration under exposure to light and air than is a corresponding polymer prepared by polymerizing the vinyl aromatic compound alone. According to the method of this co-pending application, it is necessary, however, that the polyhydric phenol be added in a proportion not greatly exceeding 0.05 per cent of the weight of the vinyl aromatic compound, since the employment of a larger proportion of the phenol results in retarded polymerization and also in the production of a low molecular weight polymer of inferior strength.

We have now found that similarly stabilized resins may be obtained by adding a polyhydric phenol to a vinyl aromatic resin after preparation of the latter and that when the addition is made in this manner, considerably larger proportions of the polyhydric phenol may be employed without impairing the properties of the polymer than is possible when the addition is made prior to polymerization as required in the above-mentioned co-pending application. Also, a resin prepared by polymerizing a vinyl aromatic compound in the presence of less than 0.05 per cent of a polyhydric phenol as specified in said co-pending application may be treated with additional polyhydric phenol in accordance with the present invention to further stabilize it against discoloration by light or air.

In stabilizing a vinyl aromatic resin in accordance with the present invention a polyhydric phenol is incorporated as uniformly as possible with the resin. Stabilization is obtained regardless of the proportion or the manner in which the polyhydric phenol is added. However, the phenolic compound is usually added in amount corresponding to between 0.03 and 3 per cent, preferably between 0.3 and 3 per cent, of the weight of the resin. The use of larger proportions, e. g., 5 per cent or more, of the phenolic compound sometimes results in discoloration due to oxidation of the phenolic compound itself upon prolonged exposure of the stabilized resin to air, particularly at elevated temperatures.

The polyhydric phenol may be incorporated with the resin by mechanical mixing at elevated temperatures on heated rolls or in other suitable manner, or by dissolving the resin in a solvent such as benzene, toluene, xylene, or ethylbenzene, etc., adding the polyhydric phenol in the desired proportion, and then evaporating the solvent. We have found that the polyhydric phenols may also conveniently be incorporated in a vinyl aromatic resin by soaking the latter in a solution of the polyhydric phenol in a liquid which is a solvent for the phenolic compound but not for the resin. During such soaking operation the resin absorbs the polyhydric phenol from the solution without itself becoming dissolved. Examples of liquid mediums which may be used in this operation are water, methanol, ethanol, propanol, isopropanol, etc. After completing the soaking operation, the solution is drained from the resin and the latter is dried. However, the mode of adding the phenolic compound is of little importance provided that it is evenly incorporated with the resin.

Vinyl aromatic resins which have been stabilized as just described may be devolatilized by blowing heated air therethrough without suffering discoloration or decomposition. An unstabilized resin, e. g., polystyrene, when similarly devolatilized to remove unpolymerized styrene and other volatile ingredients therefrom is usually discolored markedly. However, polystyrene or other vinyl aromatic resin, which has not previously been stabilized by treatment with a polyhydric phenol, may be devolatilized without suffering appreciable discoloration by blowing the same with a heated gas, e. g., air, nitrogen, carbon dioxide, etc., which contains a small proportion of a vaporized polyhydric phenol. During such operation, the resin absorbs the polyhydric phenol from the gas stream and thus becomes stabilized. The stabilized resins remain colorless during exposure at room temperature to light and air for longer periods than do corresponding resins which have not been treated with a polyhydric phenol.

The following examples illustrate certain ways in which the principle of the invention has been applied, but are not to be construed as limiting its scope.

*Example 1*

A sample of pure granular polystyrene and another sample of polystyrene from the same source, which, however, had been treated with 0.3 per cent by weight of para-tertiary-butyl-catechol, were each passed during a period of 15 minutes repeatedly through compounding rolls heated to a temperature of approximately 150° C. At the close of this treatment the sample which contained no para-tertiary-butyl-catechol was faintly yellow, whereas the other sample remained clear and colorless and contained the para-tertiary-butyl catechol uniformly incorporated with the polystyrene. Each sample was then granulated. The granular materials were each molded at a temperature of 160° C. to form test plates of the same thickness. The test plates were placed equal distances from a carbon electrode arc lamp and were simultaneously exposed to ultra-violet light from the lamp for 400 hours. At the close of this treatment the plate of pure polystyrene was distinctly yellow, i. e., it was of deeper yellow color than before exposure to the light, whereas the plate of polystyrene which contained para-tertiary-butyl catechol remained clear and colorless.

*Example 2*

Several portions of granular polystyrene were soaked in separate solutions of para-tertiary-butyl-catechol and ethanol for the respective periods given in the following table. Each solution used in such soaking operation initially contained 1 per cent by weight of para-tertiary-butyl-catechol. After completing the soaking operations, the samples of granular resins were filtered free of the liquor, dried, and molded at a temperature of 160° C. into test plates of the same thickness. A similar test plate was molded from pure granular polystyrene. The transparency of each plate to visible light was determined by exposing the plate to light from a tungsten filament lamp operating at its normal voltage and measuring the intensity of the light transmitted through the plate. Each "per cent transparency" value given in the table is the intensity of light transmitted through a plate expressed as per cent of the intensity of the light entering the plate. After such measurement of the transparency of the freshly molded plates, the latter were aged by exposure to ultra-violet light of sandard intensity for 400 hours. The aging, i. e., discoloration due to exposure to light, which pure polystyrene undergoes during 400 hours of exposure to light of the intensity used, corresponds approximately to the aging which pure polystyrene of the same quality undergoes upon outdoor exposure to sunlight for one year in the northern part of the United States. After completion of the aging operation, each plate was again tested to determine its transparency. The table gives the time during which each sample of granular polystyrene was soaked in the para-tertiary-butyl-catechol solution. It also gives the initial per cent transparency of each plate molded from the granular polystyrene and the transparency of each plate after being aged as described above. In the table, the sample indicated as having 0 soaking time was the test plate molded from pure polystyrene which had not been treated with para-tertiary-butyl-catechol.

Table 1

| Run No. | Soaking time | Percent transparency of molded plates | |
|---|---|---|---|
| | | Before aging | After aging |
| | *Minutes* | | |
| 1 | 0 | 91 | 78 |
| 2 | 2 | 91 | 81 |
| 3 | 1,440 | 87 | 81 |
| 4 | 4,320 | 85 | 82 |

*Example 3*

The purpose of this example is to illustrate the effectiveness of polyhydric phenols in inhibiting discoloration of plasticized polystyrene during heating of the latter in contact with air. A solution of 1 part by weight of polystyrene and 2 parts of the plasticizing agent, ethylene glycol di-para-tertiary-butyl-phenoxy-acetate, and 7 parts of benzene was prepared. A portion of this solution was used to coat one face of several glass plates, after which benzene was evaporated to leave deposited on the plates films of the plasticized polystyrene of between 0.002 and 0.003 inch thickness. Other portions of the above mentioned solution were treated with the respective polyhydric phenols named in the following table in the proportions also given. Each proportion of a polyhydric phenol given in the table is the per cent by weight of such compound, based on the weight of polystyrene present. The solutions of polystyrene and polyhydric phenols were cast as films on glass plates as above described. Each plate was heated in contact with air at a temperature of 150° C. for 3 hours. The plates were then cooled and tested to determine their transparency toward ultra-violet light. This test was carried out by exposing each plate to ultra-violet light of standard intensity and measuring the intensity of the light transmitted through the plate. The "per cent U. V. transparency" of each test plate given in the table is the intensity of the ultra-violet light transmitted through the plate expressed as per cent of the intensity of the light entering the plate. The glass plates upon which the films were cast were equally transparent to ultra-violet light; hence the transparency values given in the table indicate the relative transparencies toward ultra-violet light of the films cast upon the plates. It may be mentioned that under these test conditions a reduction in transparency of a film appears to be due largely to discoloration of the film through oxidation by air during the heating operation. Accordingly, the films having the largest transparency values are those which are most resistant to such oxidation and resultant discoloration. The transparency value for film of pure polystyrene alone which is given in the table is an average of the values obtained in four tests of such film.

TABLE 2

| Run No. | Polyhydric phenol | | Percent U. V. transparency |
|---|---|---|---|
| | Kind | Conc. | |
| 1 | None | | 26 |
| 2 | Catechol | 0.1 | 32 |
| 3 | -----do----- | 0.5 | 38 |
| 4 | -----do----- | 3.0 | 44 |
| 5 | Resorcinol | 0.1 | 32 |
| 6 | -----do----- | 0.5 | 34 |
| 7 | -----do----- | 3.0 | 36 |
| 8 | Hydroquinone | 0.1 | 31 |
| 9 | -----do----- | 0.5 | 43 |
| 10 | -----do----- | 3.0 | 27 |
| 11 | B.B-Bis-(4-hydroxy-phenyl)-isopropane | 0.1 | 32 |
| 12 | -----do----- | 0.5 | 41 |
| 13 | -----do----- | 3.0 | 54 |
| 14 | 0.0'-Di-hydroxy-benzophenone | 3.0 | 45 |
| 15 | p-Tertiary-butyl-catechol | 0.02 | 38 |
| 16 | -----do----- | 0.1 | 45 |
| 17 | -----do----- | 0.5 | 40 |
| 18 | -----do----- | 3.0 | 75 |

Other polyhydric phenols which may be employed as stabilizing agents for vinyl aromatic resins in accordance with the invention are pyrogallol, 3-methyl catechol, 3.5-diethyl catechol, tertiary-amyl catechol, etc. All polyhydric phenols are useful as stabilizing agents for vinyl aromatic resins in accordance with the present method, but catechol and the nuclear alkylated catechols are particularly effective. For convenience, catechol and the nuclear alkylated catechols are referred to generically, in certain of the claims, as "catechol compounds."

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method of stabilizing a vinyl aromatic resin against deterioration under exposure to light and air which comprises incorporating therewith a minor proportion of a polyhydric phenol.

2. The method of stabilizing a vinyl aromatic resin against oxidation which comprises incorporating therewith between 0.03 and 3 per cent by weight of a polyhydric phenol.

3. The method of stabilizing a vinyl aromatic resin which comprises incorporating therewith between 0.3 and 3 per cent of a catechol compound.

4. The method which comprises incorporating a minor proportion of a polyhydric phenol with a vinyl aromatic resin which contains an unpolymerized vinyl aromatic compound as an impurity and thereafter contacting the resin with a current of a heated gas to vaporize and remove the unpolymerized vinyl aromatic compound therefrom.

5. The method which comprises contacting a vinyl aromatic resin which contains a volatile impurity with a current of a heated gas containing a small proportion of a vaporized polyhydric phenol, whereby the volatile impurity is vaporized and removed from the resin and the latter absorbs the polyhydric phenol from the gas stream and thus becomes stabilized.

6. The method which comprises contacting polystyrene which contains unpolymerized styrene with a current of heated air containing a vaporized catechol compound, whereby styrene is vaporized and removed from the polystyrene and the latter absorbs the polyhydric phenol from the gas stream and thus becomes stabilized.

7. The method of stabilizing a vinyl aromatic resin which comprises contacting the resin with a solution of a polyhydric phenol in a liquid which is a non-solvent for the resin, whereby the latter absorbs the polyhydric phenol from the solution.

8. The method of stabilizing polystyrene which comprises incorporating therewith between 0.3 and 3 per cent by weight of a catechol compound.

9. The method of stabilizing polystyrene which comprises contacting polystyrene with an alcholic solution of a catechol compound, whereby the polystyrene absorbs the polyhydric phenol from the solution.

10. The method of stabilizing polystyrene which comprises incorporating therewith between 0.3 and 3 per cent of para-tertiary-butyl-catechol.

LORNE A. MATHESON.
RAYMOND F. BOYER.
JAMES L. AMOS.